(12) United States Patent
Fitzgerald

(10) Patent No.: US 6,546,254 B2
(45) Date of Patent: Apr. 8, 2003

(54) METHOD AND APPARATUS FOR INTELLIGENT DYNAMIC FREQUENCY REUSE

(75) Inventor: Shane Michael Fitzgerald, Long Beach, CA (US)

(73) Assignee: IP MobileNet, Inc., Santa Fe Springs, CA (US)

( * ) Notice: Subject to any disclaimer, the term of this patent is extended or adjusted under 35 U.S.C. 154(b) by 47 days.

(21) Appl. No.: 09/777,410

(22) Filed: Feb. 6, 2001

(65) Prior Publication Data

US 2002/0107013 A1 Aug. 8, 2002

(51) Int. Cl.⁷ ............................. H04Q 7/20; H04B 7/00
(52) U.S. Cl. .................. 455/447; 455/450; 455/452; 455/522
(58) Field of Search .......................... 455/446, 447, 455/448, 450, 452, 456, 69, 522, 560, 561, 423, 507, 509, 526

(56) References Cited

U.S. PATENT DOCUMENTS

| | | | | |
|---|---|---|---|---|
| 5,278,992 A | * | 1/1994 | Su et al. | 455/69 |
| 5,530,913 A | * | 6/1996 | Scholefield | 455/450 |
| 5,845,212 A | * | 12/1998 | Tanaka | 455/437 |
| 5,857,155 A | * | 1/1999 | Hill et al. | 455/456 |
| 6,081,718 A | * | 6/2000 | Ando et al. | 455/447 |
| 6,141,557 A | * | 10/2000 | Dipiazza | 455/446 |

* cited by examiner

*Primary Examiner*—Nguyen Duc
(74) *Attorney, Agent, or Firm*—Edward Jorgenson

(57) ABSTRACT

A method of intelligent dynamic frequency reuse includes transmitting a first signal on a selected frequency with a first one of a plurality of fixed stations, the signal being directed to a first one of a plurality of mobile cellular phone users, receiving a second signal for transmission to a second one of the plurality of mobile cellular phone system users at a second one of the fixed stations, transmissions from the second fixed station on the selected frequency being capable of interfering with reception of transmissions from the first fixed station by the first one of the plurality of mobile cellular phone users, determining whether transmission of the second signal on the selected frequency from the second fixed location would interfere with reception of the first first signal by the first one of the plurality of mobile cellular phone users, and transmitting the second signal from the second one of the fixed stations on the selected frequency when the transmission will not interfere with simultaneous reception of the first signal by the first one of the plurality of mobile cellular phone or receiver units. In one embodiment, the system adjusts the power level of transmissions from the fixed transmission stations to minimize interference. In another embodiment, the system utilizes information provided from the mobile receivers and/or database(s) to simultaneously transmit multiple signals to multiple mobile receivers where physical obstructions block otherwise interfering transmissions.

20 Claims, 6 Drawing Sheets

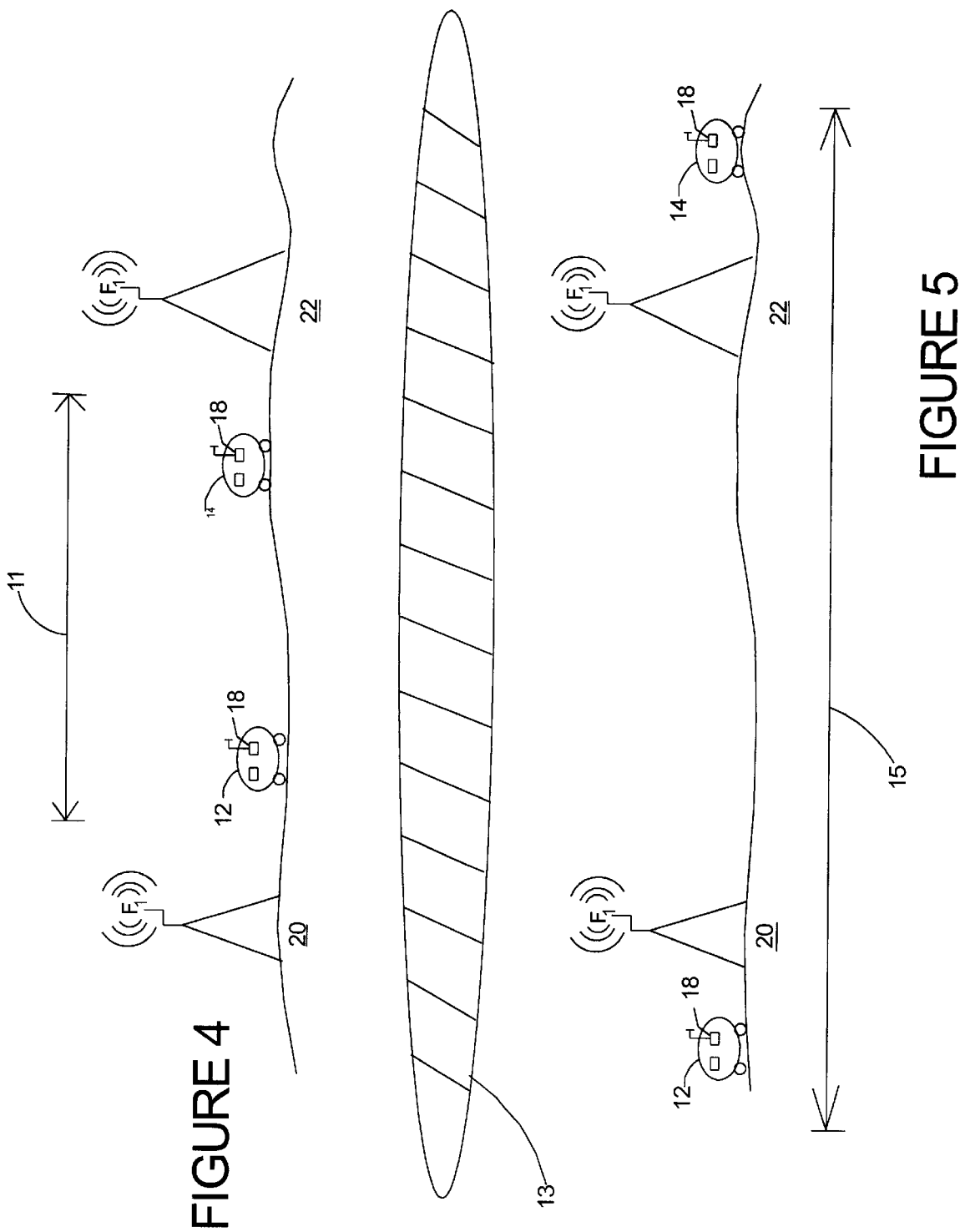

METHOD AND APPARATUS FOR INTELLIGENT DYNAMIC FREQUENCY REUSE

TECHNICAL FIELD

The present invention relates to systems and methods for wireless information and data transmission, and in particular, to frequency reuse for such transmissions.

BACKGROUND OF THE INVENTION

Frequency reuse is a term used to describe the ability to reuse frequencies for information and data transmission repeatedly within a single system. Presently, frequency reuse is made possible through the basic design approach utilized in cellular technology. A "cell" is the basic geographic unit of a cellular system and is served with a low-powered radio frequency transmitter/receiver. Frequency reuse is a common system configuration in which certain frequencies are re-used in distinct areas.

Because a cell in a cellular system is designed to use a given radio frequency only within its given geographic boundary, the same frequencies may be re-used in other, distant, cells with little potential for interference. As a general rule, areas where frequencies are reused must exhibit sufficient isolation from each other so as to avoid co-channel interference. Frequency reuse is the feature that allows a cellular system to handle a very large volume of transmissions with a limited number of channels. Advanced Mobile Phone Service (AMPS), also known as the North American analog cellular phone system, is based upon frequency reuse. AMPS and its variants represent the majority of cellular voice systems installed in the world.

Currently however, frequency reuse is limited due to static geographical boundaries imposed by the need for isolation of areas where frequencies are reused in order to avoid co-channel interference. Thus, there is a need for an apparatus and method that expands the potential for frequency reuse beyond the limitations imposed by static geographic boundaries.

SUMMARY OF THE INVENTION

The invention provides an Intelligent Dynamic Frequency Reuse ("IDFR") system that provides sufficient isolation, whether by distance, obstruction, or other means, between the reuse areas to ensure minimal or no co-channel interference, permitting multiple transmissions on a single frequency. For example, the system permits frequency reuse in circumstances in which an obstruction between a transmission site operating on a selected frequency and mobile receiver provides enough isolation so as to allow a second transmitter to transmit to the mobile receiver.

In one embodiment, a method of transmitting and receiving radio signals in a cellular telephone system including a plurality of fixed stations and a plurality of mobile cellular phone system users includes the steps of: (a) transmitting a first signal on a selected frequency with a first one of the plurality of fixed stations, the signal being directed to a first one of the plurality of mobile cellular phone users; (b) receiving a second signal for transmission to a second one of the plurality of mobile cellular phone users at a second one of the fixed stations, transmissions from the second fixed station on the selected frequency being capable of interfering with reception by the first one of the plurality of mobile cellular phone users of transmissions from the first fixed station, (c) determining whether transmission of the second signal on the selected frequency from the second fixed location would interfere with reception of the first signal by the first one of the plurality of mobile cellular phone users, and (d) transmitting the second signal from the second one of the fixed stations on the selected frequency when the transmission will not interfere with simultaneous reception of the first signal by the first one of the plurality of mobile cellular phone users. The method may also contain one or more of the following steps: (1) determining the distance of the first and second mobile users from the first and second fixed stations, (2) determining the location of the first and second mobile users, (3) adjusting the power level at which the second transmission is transmitted to a level at which the transmission will not interfere with reception of the first signal by the first mobile user but sufficient to allow the second mobile user to receive the second signal, (4) adjusting the power level at which the first transmission is transmitted to a level at which the transmission will not interfere with reception of the second signal by the second user but sufficient to allow the first user to receive the first signal, and (5) determining whether a physical obstruction would prevent or block transmission of the second signal on the selected frequency from the second fixed location from interfering with reception of the first signal by the first one of the plurality of mobile cellular phone users and/or searching a database to identify at least one physical obstruction that would prevent transmission of the second signal on the selected frequency from the second fixed location from interfering with reception of the first signal by the first one of the plurality of mobile cellular phone users.

The IDFR system provides for economical system growth and/or system expansion. Initially, radio sites are chosen to provide maximum coverage and as the number of subscribers grows, the number of sites is increased. With the implementation of the IDFR system, new transmitter sites are chosen not for coverage, but for increased capacity. The proliferation of the Internet and DSL technology combined with low-cost base stations which can be interconnected via the Internet establishes an extremely attractive and economical system to deploy in a new area, or to expand in an established area.

BRIEF DESCRIPTION OF THE DRAWINGS

Referring now to the Drawings, in which like reference numerals designate the same or similar elements throughout and wherein:

FIG. 4 is an illustration of fixed wireless transmission stations and mobile receivers, such as mobile subscriber units, located in first positions;

FIG. 5 is an illustration of fixed wireless transmission stations and mobile receivers, such as mobile subscriber units, located in second positions;

DETAILED DESCRIPTION

Figure 1:
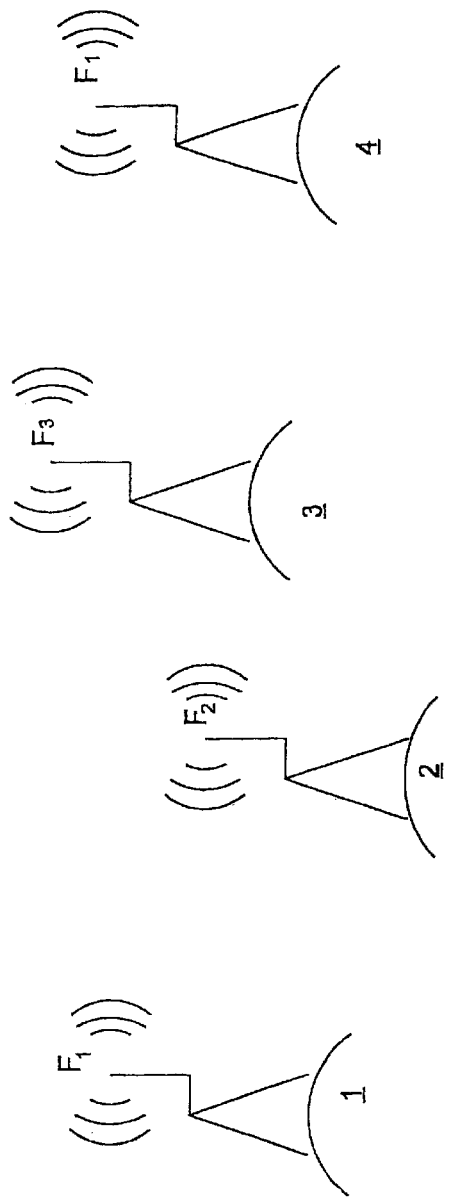
FIG. 1 is an illustration of a plurality of fixed wireless transmission stations transmitting on two frequencies.

The system and method of the invention, Intelligent Dynamic Frequency Reuse (IDFR), increases the available bandwidth of a given radio channel by permitting and providing multiple simultaneous co-channel transmissions from multiple transmission sites to multiple fixed/mobile users based upon intelligent characterization of the individual and combined transmission paths used to effect such transmissions. The IDFR system provides ubiquitous coverage over large areas, suitable for statewide/nationwide systems, while providing the maximum throughput using as little as one single frequency. The IDFR system is capable of being self-configuring, intelligent, and automatic.

In one embodiment, the invention provides a method of transmitting wireless signals comprising the steps of (1) transmitting signals with a first wireless transmitter located at a fixed location on a selected frequency within a predetermined geographic area for reception by a first mobile receiver; (2) determining whether a second fixed-location transmitter may simultaneously transmit signals on the selected frequency within the predetermined geographic area for reception by a second mobile receiver, without interfering with reception of signals transmitted by the first transmitter by a first mobile receiver; and (3) transmitting signals with the second fixed-location transmitter on the selected frequency for reception by the second mobile receiver when such transmissions will not interfere with reception of signals transmitted by the first transmitter by the first mobile receiver. In one aspect, the method provides for adjusting the power level of transmissions made with the second transmitter on the selected frequency to a level at which transmissions by the second transmitter on the selected frequency do not interfere with reception, by the first mobile receiver, of signals transmitted by the first transmitter. In another aspect, each of the mobile receivers transmits the received signal strength level of the first and second transmitter and/or its location for reception by at least one of the fixed transmitters. The transmission power of the first and second fixed transmitters may be dynamically adjusted based upon the received strength level transmitted by at least some of the mobile transmitters to minimize interference between transmissions.

The method may also include the step of utilizing a database to determine if an object blocks reception of signals transmitted by the first fixed-location transmitter by the second mobile receiver or if an object blocks reception of signals transmitted by the second fixed-location transmitter by the first mobile receiver.

As set forth in detail below, the IDFR system of the invention provides a method of encompassing very large areas within a cellular system while maximizing throughput with minimal frequency resources. IDFR technology is a throughput multiplying technology, capable of utilizing wide-dynamic-range power control, multi-access protocols, and an intelligent wireless network with a distributed intelligence architecture, to provide high throughput per frequency resource in a cost-effective, flexible, scalable architecture.

Referring now to FIG. 1, an example of a system using frequency reuse system is schematically illustrated. As shown, there are four radio transmission sites 1, 2, 3, 4, respectively. Sites 1 through 3 use different frequencies, $f_1$, $f_2$ and $f_3$, respectively. Site 4, however, is far enough away from site 1 that frequency $f_1$ can be reused, i.e., the distance between site 1 and site 4 is great enough to provide the geographical isolation necessary to allow simultaneous transmission using frequency $f_1$ without any co-channel interference between sites 1 and 4.

Figure 2:
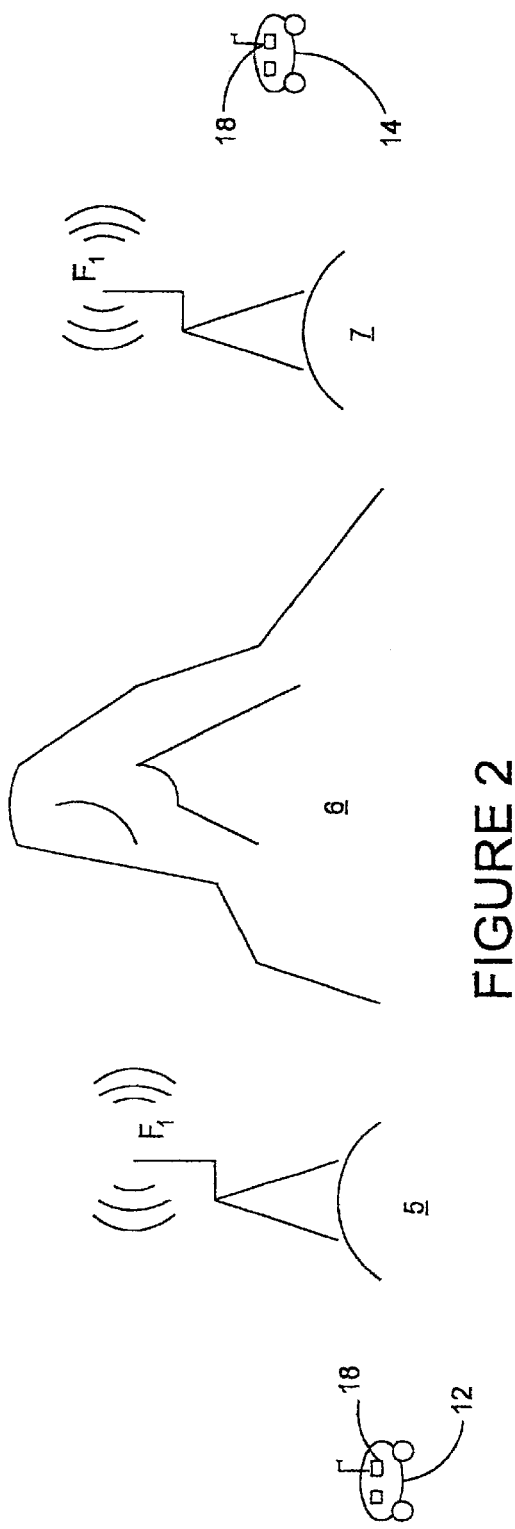
FIG. 2 is an illustration of fixed wireless transmission stations, wherein a physical obstruction blocks at least part of the transmissions from the fixed stations.

The system of the invention, an IDFR system, is significantly different than the common frequency reuse scheme illustrated above. Referring now to FIG. 2 there is a schematic representation of such a situation. As illustrated in FIG. 2, there are two radio sites, site 5 and site 7 separated by an obstruction such as a mountain 6, that provides sufficient isolation so that simultaneous transmission using $f_1$ from both sites 5 and 7 to mobile subscriber units 12 and 14 is possible with no co-channel interference. The system of the invention is capable of exploiting such circumstances to provide frequency reuse because in the IDFR system, the reuse areas are not fixed, but are dynamic and may be temporal in nature.

Figure 3:
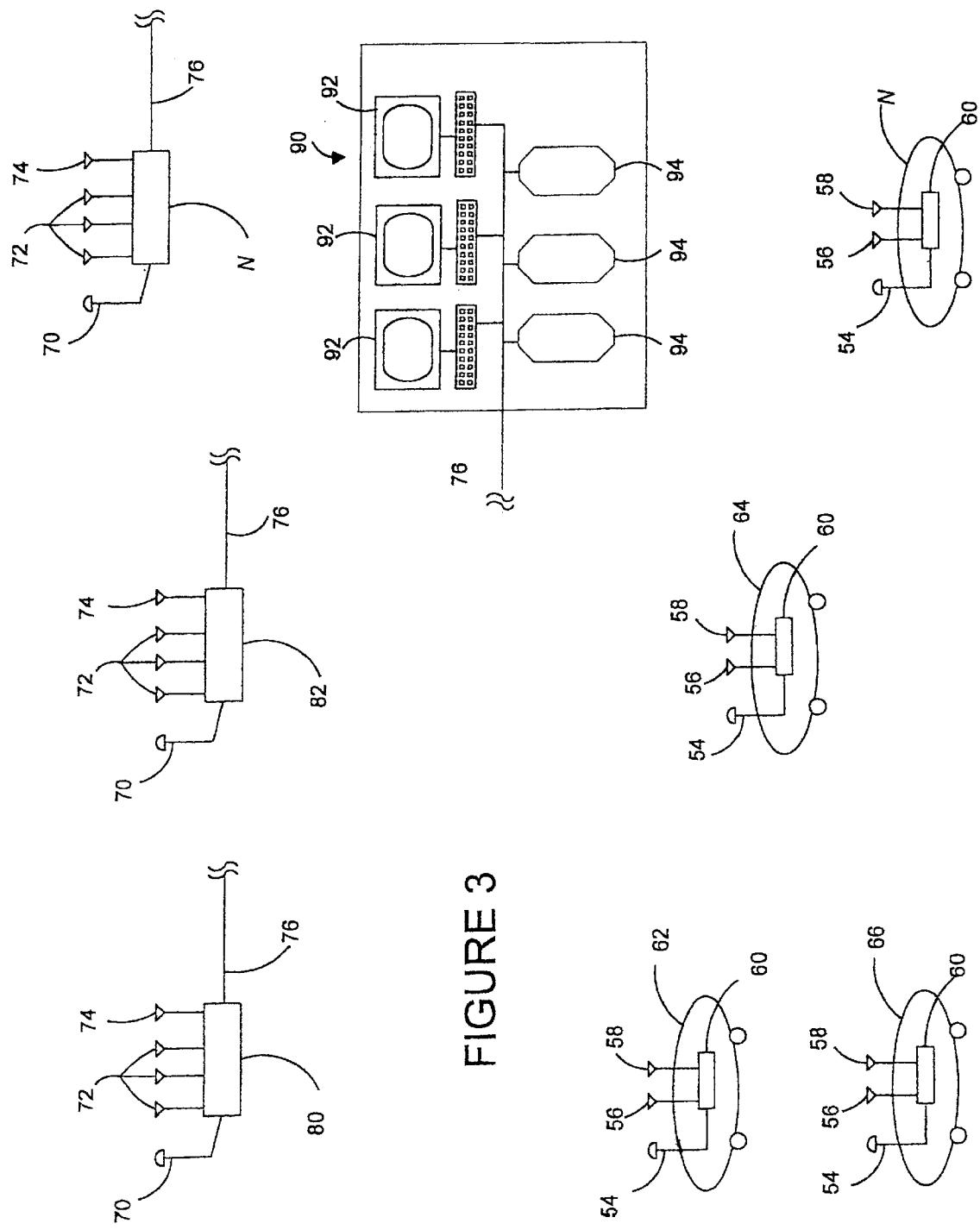
FIG. 3 is a schematic representation of one embodiment of a transmission system of the invention.

Referring now to FIG. 3 there is shown a schematic of one embodiment of the system of the invention. As illustrated, the system comprises a plurality of fixed radio sites or base stations 80, 82, . . . N, each of which is equipped with a plurality of radio receivers 72, at least one transmitter 74 a network connection 76 and a Global Positioning System (GPS) receiver unit 70.

As illustrated, the system serves a plurality of mobile subscriber units 62, 64, 66, . . . , N. As shown, each of the mobile subscriber units is preferably equipped with a receiver 56, a receiver/transmitter 58 and a GPS receiver unit 54, all of which maybe incorporated into a single communications module 60. Each of the fixed radio sites 80,82, . . . M is connected via a network 76 (ethernet) to a central control unit 90. The central control unit 90 includes one or more Internet Protocol Network Controllers (IPNC) 92 with one or more databases 94. A plurality of central control units may be linked together electronically, for example via the Internet, to increase the coverage area.

Databases 94 may include a variety of information including one or more propagation path loss databases for the surrounding area, the IDs, locations and transmission capabilities of the transmission sites, and other similar data necessary to implement algorithms for dynamically controlling transmissions with the coverage are of the particular IPNC. The IPNC(s) 92 and database(s) 94 implement the IDFR system and method which controls radio transmissions between sites 80, 82, . . . M and mobile subscriber units 62, 64, 66, . . . , N using the information contained in the databases 94 along with information received from the mobile subscriber units 60, 62, 64, . . . , N which is processed utilizing one or more algorithms.

Each of the radio site transmitters 80, 82, . . . M has a unique ID. Each of the mobile subscriber units 62, 64, 66, . . . , N report to an IPNC 92 the RSL (Received Signal Level) of all radio sites it can receive. If a subscriber radios does not report a RSL for a particular site, that site is assumed to have an RSL below the reception threshold. Preferably, each of the mobile subscriber units 62, 64, 66, . . . , N also reports its position, as determined by the GPS receiver 54, to the IPNC on demand or at predetermined intervals. Each base station 80, 82, . . . M may also have embedded GPS but primarily for synchronized timing to ensure co-channel launches are accurately synchronized regardless of any differential delays introduced in transiting via the Internet to the various other base station sites.

Referring now to FIGS. 4 and 5, a two-site, single-channel system is illustrated for the purpose of explaining the operation of the system of the invention. While the system illustrated in FIGS. 4 and 5 is limited to a two-site, single-channel system, it will be understood that the IDFR system of the invention can support a virtually unlimited number of sites and channels. As shown in FIG. 4, two fixed radio sites, 20 and 22 respectively, provide coverage over a much larger area 13 than either of the sites could cover individually. However, the coverage areas of the two sites include an overlap area 11. As illustrated, two mobile subscriber units 12 and 14, each equipped with radio (cellular) units 18, are present within the overlap area 11 located approximately midway between the two radio sites 20 and 22. The Received Signal Level (RSL) that the mobile subscriber units 12 and 14 would receive from sites 20 and 22 would be almost equal since the two signals travel similar distances over similar terrain.

Thus, if site 20 transmits to mobile subscriber 12 at the same time as site 22 transmits to mobile subscriber 14 on the same frequency, the received signal at the mobile subscriber units 12 and 14 would be each be garbled and unrecoverable due to interference between the signals. In this case the IDFR system of the invention would recognize this condition as one in which simultaneous transmission from the two sites on the same frequency to these particular mobile subscribers should not permitted. If messages needed to be transmitted to mobile units 12 and 14 at the same time, the messages would be transmitted sequentially, first one site, for example site 20, would be allowed to transmit a message for mobile subscriber unit 12, then site 22 would be allowed to transmit the message for mobile subscriber 14.

Turning now to FIG. 5, the locations of the mobile subscriber units 12 and 14 have changed. Mobile subscriber unit 12 is now close to a transmitter of site 24 and likewise, mobile subscriber unit 14 has moved to a location that is close to the location of site 26. As illustrated, mobile subscriber units 12 and 14 have moved out of the overlap area 11. In this example, the proximity of the mobile subscriber units 12 and 14 to the transmission sites 20 and 22 is sufficient to allow the mobile units to "capture" signals from the transmission sites.

FM "capture" is a well-known phenomenon which occurs often with FM radios in the mobile environment. If a receiver has impressed upon its antenna two distinct signals from separate transmission sources, and if the difference between the amplitude of the signals is at or above the FM capture level, then only the stronger of the two signals will be received. The stronger of the two signals will be "captured" by the receiver as if the second signal were not present.

Thus, in the example illustrated in FIG. 5, the RSL of the signal received by mobile subscriber 12 from site transmission site 24 would have sufficient amplitude to capture the receiver of mobile subscriber unit 12 due to the proximity of the mobile subscriber unit to the site. Likewise, the RSL of the signal received by mobile subscriber 14 from transmission site 22 would have sufficient amplitude to capture the receiver of mobile subscriber unit 14 due to the proximity of the mobile subscriber unit to the site. In this scenario, the IDFR system, having been provided by the RSL levels of the transmissions by the mobile subscriber units 12 and 14 will recognize that the mobile subscriber units 12 and 14 can capture simultaneous transmissions from transmission sites 20 and 22 respectively, individually and without interference. The IDFR system will therefore permit and launch simultaneous co-channel transmissions to the two mobile subscriber units 12 and 14.

Figure 6:
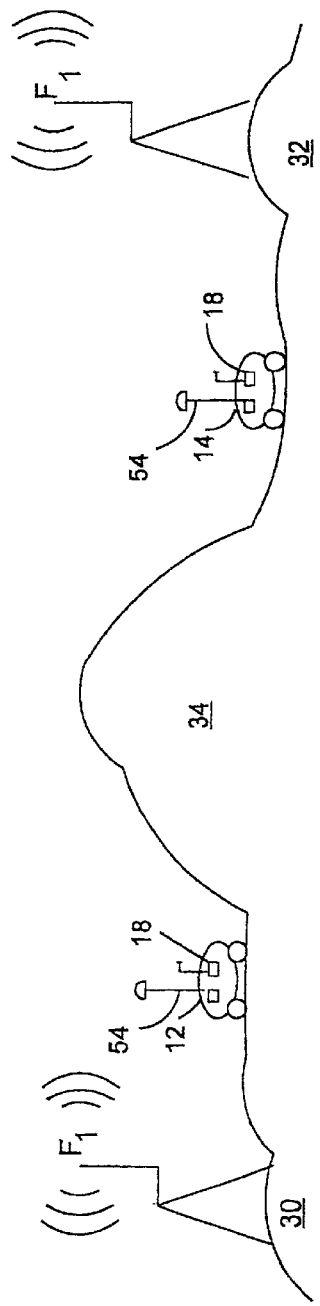
FIG. 6 is an illustration of fixed wireless transmission stations such as cellular base stations and mobile receivers such as mobile cellular subscribers, wherein a physical obstruction blocks reception of transmissions from the fixed stations by at least one of the mobile subscriber units.

Referring now to FIG. 6, mobile subscriber units 12 and 14 are positioned on opposite sides of a topographical obstruction, hill 34, present in a coverage area served by radio sites 30 and 32. Hill 34 serves to block transmission of a signal from site 30 to mobile subscriber unit 14. Hill 34 likewise blocks transmission of a signal from site 32 to mobile subscriber 12. In this example, the effects of the terrain provide the required isolation for simultaneous co-channel transmissions from site 30 to mobile subscriber 12 and from site 32 to mobile subscriber 14. In this example, mobile subscriber units 12 and 14 are each equipped with a GPS receiver 54 and have reported their respective positions to the IPNC. IPNC 92, utilizing a propagation path loss data base reflecting the presence of hill 34 between units 12 and 14, recognizes that hill 34 would block interfering transmissions. Consequently, the IPNC 92 enables the launch of simultaneous transmissions from site 30 to mobile subscriber unit 12 and from site 32 to mobile subscriber unit 14 on the same frequency, thereby, doubling the instantaneous bandwidth of the combination of sites 30 and 32.

Figure 7:
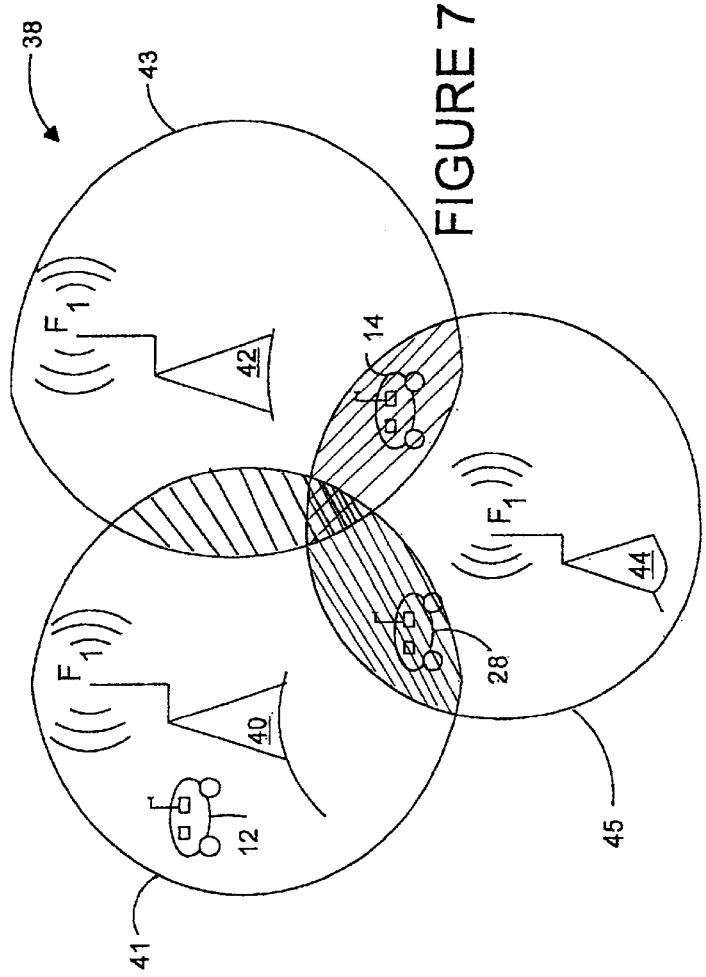
FIG. 7 is an illustration of interference zones generated by a plurality of fixed wireless transmission stations such as cellular base stations, each transmitting on the same frequency at a high power level.
Figure 8:
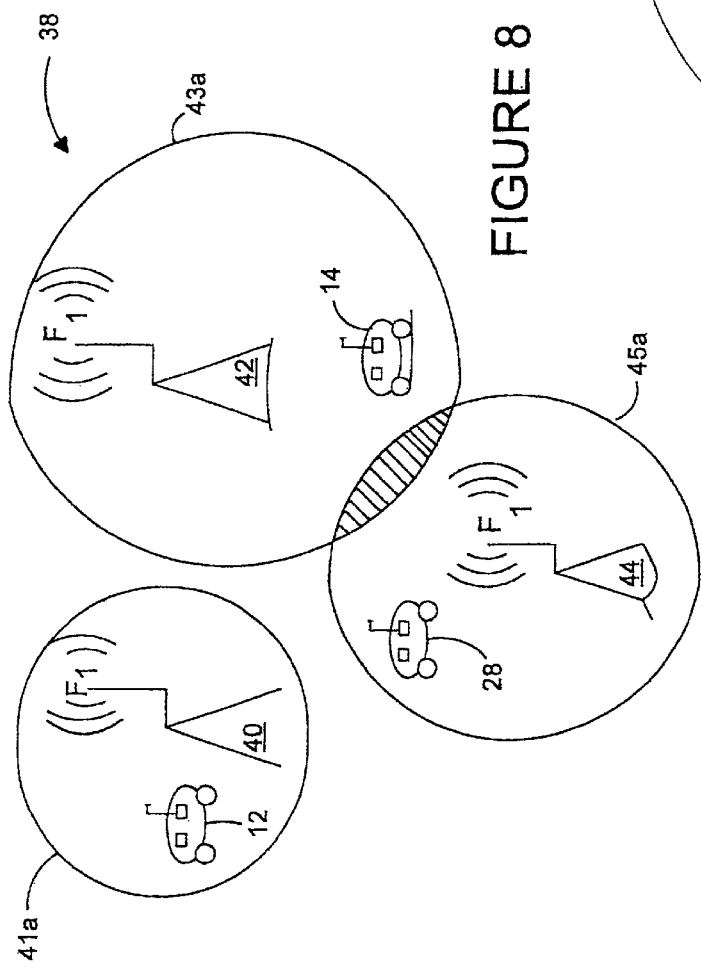
FIG. 8 is an illustration of the plurality of fixed wireless transmission stations of FIG. 7 wherein the transmission power level of each transmission station is dynamically controlled to reduce co-channel interference.

Turning now to FIGS. 7 and 8, there is illustrated a cellular system 38, consisting of three cellular transmission sites, 40, 42, and 44, along with three mobile subscriber units, 12, 14 and 28. In FIG. 7, each of the sites 40, 42 and 44 is transmitting at full power, covering the areas represented by circles 41,43 and 45. As illustrated, the high power level transmissions from each of the sites results in an overlap in coverage where two of the mobile subscriber units, 14 and 28, are located. The overlap in transmission coverage prevents simultaneous transmissions to mobile subscriber units 14 and 28 because there is not sufficient isolation to prevent co-channel interference.

Referring now to FIG. 8, the invention provides a method of simultaneously transmitting a plurality of signals from a plurality of the fixed stations on a single selected frequency, each of the transmissions being directed to a selected one of the mobile cellular phone units. This is achieved by continuously adjusting the power level of each transmission on the selected frequency to a level at which the transmissions from the fixed stations on the selected frequency do not interfere with reception of the signals by the selected mobile cellular phone units but are sufficient to enable reception of each transmission directed to a selected one of the mobile cellular phone units by the selected mobile cellular unit.

As illustrated in FIG. 8, system 38 is using a dynamic power control algorithm implemented in the IDFR system. The algorithm automatically limits the power of transmissions from a given site for example, from site 40 to mobile subscriber unit 12, to the level required for reliable communications. As shown, the transmission power levels of sites 40, 42 and 44 have been reduced, thereby reducing the respective coverage areas as represented by circles 41*a*, 43*a* and 45*a*. The IDFR system, by reducing the power levels and corresponding coverage areas of the sites has greatly reduced the coverage overlap area. Thus, as shown, none of the mobile subscribers 12, 14 or 28 is positioned in an overlap area. In this case the IDFR system permits simultaneous transmissions from sites 40, 42 and 44 to mobile subscriber units 12, 14, and 18, respectively, on the same frequency without co-channel interference. As will be appreciated in connection with this example, the use of precise, wide-dynamic-range transmit power control, both at the base station and at the mobile subscriber unit, greatly enhances the use and capabilities of the IDFR system.

Figure 9:
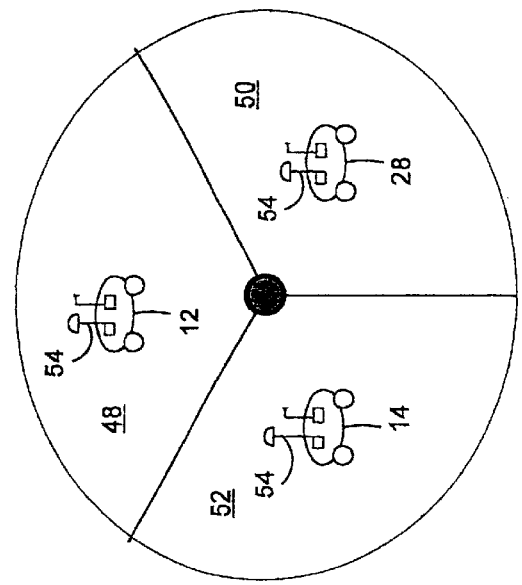
FIG. 9 is an illustration of a fixed wireless transmission station and cellular mobile subscribers wherein the transmission station utilizes directional transmissions to minimize co-channel interference.

In yet another embodiment of the invention, antenna pattern discrimination can be used to achieve the isolation between co-located sites. Referring now to FIG. 9, there is illustrated a system utilizing three 120-degree sector panel antennas 47, 49 and 51 to divide the coverage area into three sectors, 48, 50 and 52, respectively. In this case, the 120 degree sector panel antennas 47, 49 and 51 provide sufficient isolation to allow simultaneous transmissions into sectors 48, 50 and 52 with out co-channel interference. As illustrated, three mobile subscriber units 12, 14 and 28 are each located in one of the sectors 48, 52 and 50, respectively. Mobile subscriber units 12, 14 and 28 have each reported their positions, determined with GPS receivers 54, to the IPNC (FIG. 3) that controls transmissions within the coverage area. The IDFR system, recognizing that the location of the mobile subscriber units 12, 14 and 28 in different coverage areas, e.g., 48, 50 and 52, respectively, permits simultaneous transmissions and enables the simultaneous launch of transmissions to each of the mobile subscriber units, thereby doubling or tripling the effective bandwidth of the site.

As illustrated above the IDFR system utilizes isolation, whether the isolation is due to the distance between sites (the near/far effect), from man-made or natural obstructions, the isolation created by dynamic power control at the base stations, or antenna pattern discrimination, all of which can serve to provide the conditions for simultaneous transmissions from multiple sites to multiple mobile subscriber units. The IPNC automatically recognizes situations where isolation can be exploited to multiplying the bandwidth of a transmission system.

The IDFR system utilizes algorithms to dynamically calculate when, where, and how many simultaneous co-channel transmissions are permitted, and automatically launches such transmissions accordingly.

The instantaneous throughput of the IDFR system is equal to the transmission rate multiplied by the number of co-channel simultaneous transmissions occurring. The IDFR system is therefore essentially a bandwidth multiplier technology. The maximum theoretical throughput is equal to n times the "over-the-air" data rate, where n is the number of sites in the system.

As will be appreciated, the signal threshold for IDFR utilization is equal to the difference in signal amplitude required for capture, plus the variation in RSL, plus some interference margin. The interference margin is a "floating" value driven by overall system performance with regard to throughput. The interference margin is reduced for aggressive throughput performance and expanded for interference avoidance dynamically and automatically.

The IDFR system of the invention may be enhanced through the use of the diversity reception system disclosed and claimed in U.S. Pat. No. 6,018,647 issued Jan. 25, 2000, to Fitzgerald, the disclosure of which is incorporated herein by reference for all purposes. The diversity reception system, in addition to providing a diversity improvement factor, also reduces the amplitude variations produced by multipath fading. This serves to more accurately reflect the actual RSL received by mobile subscriber units.

Figure 10:
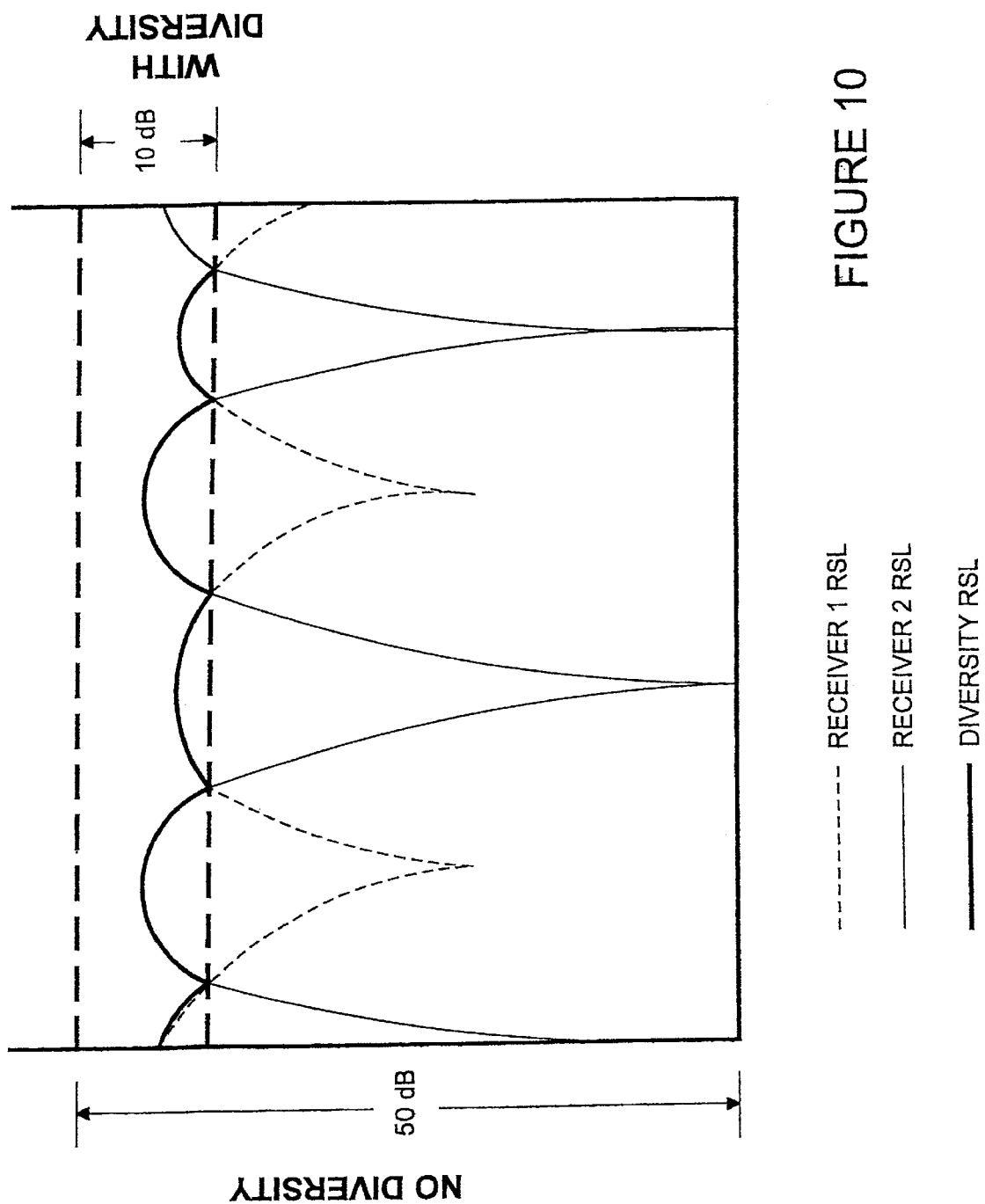
FIG. 10 is a graphical representation of the reduction in amplitude variation of RSL provided by a diversity reception system.

The reduction in RSL amplitude variation also provides for increased incidence of FM capture. Absent the smoothing effect on signal amplitude provided by the diversity reception system, the required difference in amplitude of RSLs required for capture would be the capture margin plus the variation caused by fading. The diversity reception system reduces the amount of variation in RSL thereby increasing incidence of FM capture. This effect, in turn, enhances the operation of the IDFR system. The reduction in amplitude variation of RSL that the diversity reception system provides is graphically represented in FIG. 10.

In one embodiment, the IDFR system utilizes mobile subscriber radios 58 in conjunction with GPS receivers 54. (FIG. 3). As will be readily appreciated, a radio transmission system in which the location of all mobile subscribers is known provides a more sophisticated and powerful system than one which does possess this information and can support features unavailable otherwise.

While the IDFR system is not dependent upon the use of GPS as location information can be gleaned by triangulation and path loss modeling over periods of time, GPS makes the IDFR system much more accurate and makes the simultaneous transmission calculations much simpler. The proliferation of GPS receivers has reduced the cost of a GPS receiver to an acceptable level. Moreover, the recent increases in GPS resolution makes the use of GPS even more attractive. For the purpose of illustration and explanation, a GPS receiver incorporated with a radio transmitter/receiver 58 in a communications module 60 in each subscriber unit 62, 64, 66, . . . , N (FIG. 3) is assumed.

In one implementation of the intelligent dynamic frequency sharing system, one or more subscriber units 62 are directed around and over the coverage area using a channel sounding algorithm which will provide radio coverage analysis. The channel sounding algorithm collects information regarding transmitter site identification, Received Signal Level (RSL) and subscriber location. This information is collected and incorporated into a system-wide path-loss data base 94 utilized by the IPNC 92. During this coverage analysis and characterization phase, beacons may be utilized at the fixed sites, to transmit in conjunction with, or instead of, the site transmitter. The transmitter associated with each site 80, 82, . . . N is uniquely identified and the transmission power level of each transmitter and/or transmission is embedded or coded into each transmission. When coverage information from the mobile subscriber unit is requested by the IPNC, the mobile subscriber unit, equipped with a GPS receiver, will report its location, the RSL received from each site received, and the power level of the transmission.

The collected information is accumulated in database 94, providing the IPNC with the expected RSL from any particular transmit site at any particular power level to any particular point in the coverage area. Analysis of the collected data provides a propagation loss data base 94 which indicates at what power level a particular site must transmit in order to communicate with a mobile subscriber at any particular point in the coverage area based upon the transmission power level or levels of other active sites transmitting within the area. Preferably, the IPNC contains instructions or algorithms which schedule the collection of coverage data during periods of relatively light traffic to avoid congesting the network with position RSL information.

In one embodiment, the IDFR system propagation loss database 94 is self-configuring and automatically adapts itself to the propagation characteristics of the system. In this embodiment, each time, or at selected intervals, when a radio in the area communicates position RSL data, the IPNC propagation path loss data base will be updated. Changes in the propagation characteristics for a given system normally change slowly with respect to time, as these changes are typically due to the changes of season, presence or absence of foliage, the presence of snow, large-scale construction projects, deforestation, and the like. For example, a stadium or similar structure constructed somewhere in a covered area could cause a change in the coverage to areas in the vicinity of the structure. In this example, during construction, the IPNC propagation path loss data base will be updated, reflecting the changes in the area. At the time construction is completed, the IPNC propagation path loss database 94 will accurately reflect the new propagation conditions resulting from construction of the structure. In this embodiment, the change in system configuration happens automatically, without human intervention.

Another bandwidth multiplying function of the IDFR system is Forced Direct Mode Operation, (FDMO). Since the IPNC knows the location of the mobile subscriber units, it also knows when the mobile subscribers are located in areas where they may communicate directly with each other using a low-power mode of operation. In this low power mode of operation, the mobile subscribers transmit on the base station's down-link frequency directly to each other using a dynamic power control algorithm which limits the power of the transmitted signal to the minimal amount required for reliable communications. This mode of operation frees the radio site to communicate to other mobile subscribers outside the vicinity of the direct mode subscribers.

As will be appreciated, in one embodiment, the invention provides a wireless transmission system consisting of a series of 1, 2, 3, . . . n fixed location transmitters, each having an transmission area at a fixed transmission power level P and a plurality of mobile receivers adapted to receive transmissions from the fixed location transmitters. In the system, at least some of the transmission areas of the fixed location transmitters define overlapping transmission areas when the fixed transmitters are transmitting at $P_1$, $P_2$, $P_3$, . . . $P_n$, respectively.

A computer, such as IPNC 92 utilizing one or more databases 94, determines whether simultaneous transmissions by a plurality of the fixed location transmitters on a single selected frequency, each of the plurality of transmissions directed to a selected mobile receiver, will interfere with reception of each transmission. The computer continuous adjusts $P_1$ and $P_2$, $P_3$, . . . $P_n$ to vary the effective transmission area of each of the fixed transmitters, allowing simultaneous transmission of signals to the selected mobile receivers on a single selected frequency without interference between the signals in overlapping areas.

Although the invention has been described in conjunction with the drawings and the foregoing Detailed Description, it will be understood that the invention is not limited to the embodiment disclosed, but is capable of numerous modifications without departing from the spirit and scope of the invention.

What is claimed is:

1. In a cellular telephone system including a plurality of fixed stations for transmitting and receiving radio signals from a plurality of mobile cellular phone system users, a method of transmitting signals comprising:

transmitting a first signal on a selected frequency with a first one of the plurality of fixed stations, the signal being directed to a first one of the plurality of mobile cellular phone users;

receiving a second signal for transmission to a second one of the plurality of mobile cellular phone system users at a second one of the fixed stations, transmissions from the second fixed station on the selected frequency being capable of interfering with reception of transmissions from the first fixed station by the first one of the plurality of mobile cellular phone users;

determining whether a physical obstruction would prevent transmission of the second signal on the selected frequency from the second fixed location from interfering with reception of the first signal by the first one of the plurality of mobile cellular phone users; and transmitting the second signal from the second one of the fixed stations on the selected frequency when the transmission will not interfere with simultaneous reception of the first signal by the first one of the plurality of mobile cellular phone users.

2. The method of claim 1 further comprising the step of determining the distance of the first and second mobile users from the first and second fixed stations.

3. The method of claim 1 further comprising determining the location of the first and second mobile users.

4. The method of claim 1 wherein determining whether a physical obstruction would prevent block transmission of the second signal on the selected frequency from the second fixed location from interfering with reception of the first signal by the first one of the plurality of mobile cellular phone users includes searching a database to identify at least one physical obstruction that would prevent transmission of the second signal on the selected frequency from the second fixed location from interfering with reception of the first signal by the first one of the plurality of mobile cellular phone users.

5. A method of transmitting wireless signals comprising:

transmitting signals with a first wireless transmitter located at a fixed location on a selected frequency within a predetermined geographic area for reception by a first mobile receiver;

utilizing a propagation path loss data base to determine whether a second fixed-location transmitter may simultaneously transmit signals on the selected frequency within the predetermined geographic area for reception by a second mobile receiver, without interfering with reception of signals transmitted by the first transmitter by a first mobile receiver; and transmitting signals with the second fixed-location transmitter on the selected frequency for reception by the second mobile receiver when such transmissions will not interfere with reception of signals transmitted by the first transmitter by the first mobile receiver.

6. The method of claim 5 further comprising the step of adjusting the power level of transmissions made with the second transmitter on the selected frequency to a level at which transmissions by the second transmitter on the selected frequency do not interfere with reception of signals transmitted by the first transmitter by the first mobile receiver.

7. The method of claim 5 further comprising the step of transmitting with the mobile receivers, the received signal strength level of the first and second transmitter by each of the mobile receivers.

8. The method of claim 7 further comprising the step of adjusting the transmission power of the first and second fixed transmitters based upon the received strength level transmitted by at least some of the mobile transmitters.

9. The method of claim 8 further comprising the step of dynamically adjusting the transmission power of the first and second fixed transmitters based upon the received strength level transmitted by at least some of the mobile transmitters to a level to insure reception by each active mobile receiver.

10. The method of claim 5 further comprising the step of each active mobile receiver transmitting its location for reception by at least one of the first and second fixed transmission locations.

11. The method of claim 5 wherein the step of determining whether a second fixed-location transmitter may simultaneously transmit signals on the selected frequency within the predetermined geographic area for reception by a second mobile receiver without interfering with reception of signals transmitted by the first transmitter by a first mobile receiver comprises utilizing a database to determine if an object blocks reception of signals transmitted by the second fixed location transmitter by the first mobile receiver.

12. The method of claim 5 wherein the path loss propagation database is automatically updated based upon selected transmissions from known locations with the predetermined geographical area.

13. The method of claim 5 wherein the propagation path loss data base includes data identifying physical obstructions preventing interference between simultaneous transmissions from two or more fixed locations within a predetermined geographical area.

14. The method of claim 5 further comprising using directional antennas to simultaneously transmit a plurality of signals from two or more of the plurality of the fixed locations on the selected frequency, each of the signals being directed to a selected one of the mobile receivers.

15. In a cellular telephone system including fixed stations for transmitting and receiving radio signals from mobile cellular phone units, a method of transmitting signals comprising:

utilizing a propagation path loss data base to determine whether two or more of the fixed stations may simultaneously transmit signals on a selected frequency to different ones of the mobile cellular units within a predetermined geographical area without interference caused by the simultaneous transmissions;

simultaneously transmitting a plurality of signals from two or more of the plurality of the fixed stations on the selected frequency, each of the signals being directed to a selected one of the mobile cellular phone units; and continuously adjusting the power level of each transmission on the selected frequency to a level at which the transmissions from the fixed stations on the selected frequency do not interfere with reception of the signals by the selected mobile cellular phone units but is sufficient to enable reception of each transmission directed to a selected one of the mobile cellular phone units by the selected mobile cellular unit.

16. The method of claim 15 further comprising each mobile cellular phone unit transmitting the received strength signal level it receives from each fixed station for reception by the fixed stations.

17. The method of claim 15 further comprising each mobile cellular phone unit transmitting its location for reception by the fixed stations.

18. The method of claim 15 wherein the path loss propagation database is automatically updated based upon selected transmissions from known locations with the predetermined geographical area.

19. The method of claim 15 wherein the propagation path loss data base includes data identifying physical obstructions preventing interference between simultaneous transmissions from two or more fixed stations within a predetermined geographical area.

20. The method of claim 15 further comprising using directional antennas to simultaneously transmit a plurality of signals from two or more of the plurality of the fixed stations on the selected frequency, each of the signals being directed to a selected one of the mobile cellular units.

* * * * *